May 6, 1969 T. J. PAVLIK 3,443,028

MODULATED SCANNING SYSTEM

Filed Oct. 13, 1964

INVENTOR
THOMAS J. PAVLIK
BY McDougall, Hersh & Scott
ATTORNEYS

United States Patent Office 3,443,028

Patented May 6, 1969

3,443,028

MODULATED SCANNING SYSTEM

Thomas J. Pavlik, Elk Grove Village, Ill., assignor to A. B. Dick Company, Niles, Ill., a corporation of Illinois Filed Oct. 13, 1964, Ser. No. 403,475
Int. Cl. H04n 5/38
U.S. Cl. 178—7.2 5 Claims

ABSTRACT OF THE DISCLOSURE

A facsimile scanning system, comprising a cathode ray tube having means for producing an electron beam and a fluorescent screen upon which the beam impinges to produce a spot of light, an optical system for focusing the light from said cathode ray tube on the object to be scanned, means for deflecting the electron beam of said tube along a scanning line, means for modulating the intensity of the light output from said tube to break up said scanning line into segments, a photoelectric device for receiving the light from said object and producing corresponding video signals, and means for differentiating said video signals to produce an output signal which reproduces said object while minimizing distortion due to the phosphor decay time of said fluorescent screen. The means for modulating the intensity of the light output from the cathode ray tube may comprise means for modulating the intensity of the electron beam, or a ruled screen disposed between the cathode ray tube and the object to be scanned. The screen comprises relatively opaque lines alternating with relatively transparent areas extending transversely to the scanning line.

This invention relates to scanning systems for scanning an object having information thereon and producing electrical signals corresponding to such information. The present invention is particularly applicable to such scanning systems as used for facsimile transmission purposes.

One object of the present invention is to provide a new and improved scanning system of the general type in which a cathode ray tube is employed to produce a flying spot of light for scanning the object to be scanned, and in which the light reflected or transmitted by the object is received by a photoelectric device adapted to produce electrical video signals corresponding to the characters, images or other information on the object.

A further object is to provide such a new and improved scanner having means for minimizing distortion of the output signals due to the decay time of the phosphor employed on the fluorescent screen of the cathode ray tube. Prior scanning systems of this type have been troubled with such distortion, which tends to change the proportions of the characters and other information when reproduced from the video signals. In general, the changes in the proportions of the reproduced information are such that fine or narrow details are rendered proportionately wider.

It is a further object to provide such a new and improved scanning system in which such distortion is reduced by modulating the light output of the cathode ray tube, so as to break up the scanning lines into segments and then differentiating the video signals from the photosensitive device. It has been found that the combination of the modulation and the differentiation brings about a significant reduction in the distortion due to the persistence or relatively slow decay of the fluorescent material on the screen of the cathode ray tube.

A further object is to produce such a new and improved scanning system in which the modulation is achieved by modulating the electron beam of the cathode ray tube with a train of pulses so that the electron beam is alternately turned on and off. In this way, each scanning line is chopped into quite a number of segments.

In another aspect, it is an object of the present invention to provide a new and improved scanning system in which such modulation of the light output of the cathode ray tube may alternatively be achieved by providing a ruled screen or grating between the cathode ray tube and the object to be scanned so that the lines on the screen will break up the scanning lines into segments. In this alternative system, the lines or rulings on the screen or grating extend transversely to the scanning lines.

Further objects and advantages of the present invention will appear from the following description, taken with the accompanying drawings, in which.

Figure 1:
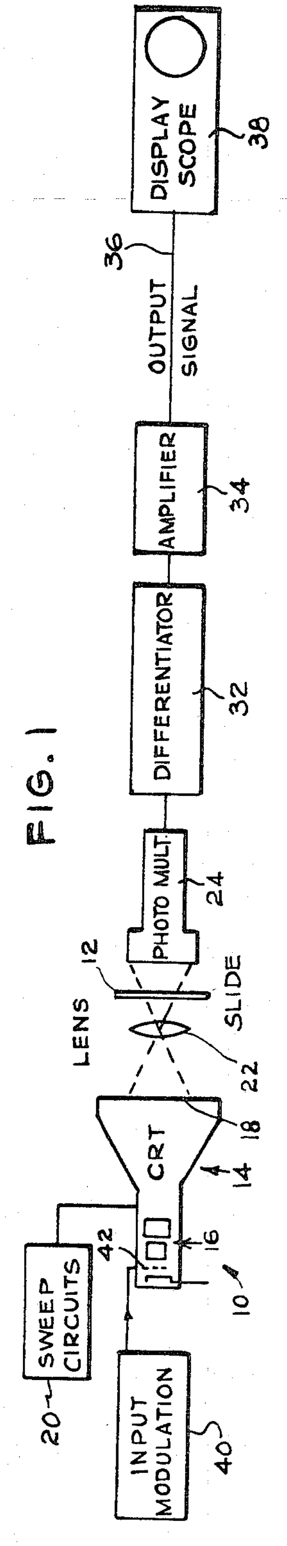
FIG. 1 is a diagrammatic view of a scanning system to be described as an illustrative embodiment of the present invention.

As already indicated, FIG. 1 illustrates a scanning system 10 which may be employed as a facsimile transmitter to produce video signals corresponding to the characters, lines, images and other information on an object 12. In this case, the object 12 is in the form of a slide or transparency, but it will be understood that the object may comprise a sheet, card, document or the like.

The scanner 10 is of the flying spot type, in which the object 12 is scanned by a rapidly moving spot of light. In the present case, the flying spot is caused to move along a series of scanning lines, but various scanning patterns may be employed, and in some cases the flying spot moves repetitively along a single scanning line.

In the illustrated scanner 10, the flying spot of light is produced by a cathode ray tube 14, which may be of the usual type having an electron gun 16 for producing a beam of electrons. The electron beam impinges upon a fluorescent screen 18 which is coated with a phosphor material adapted to produce light when struck by the electrons. Sweep circuits 20 are provided to deflect the electron beam so that it will traverse the desired scanning lines. The cathode ray tube 14 may employ either electrostatic or electromagnetic deflection of the electron beam.

The deflection of the electron beam produces a raster of scanning lines on the screen 18 of the cathode ray tube 14. The light from the raster is focused on the slide 12 by a lens or optical system 22. Thus, the flying spot of light produces a raster of scanning lines on the slide 12.

The light transmitted or reflected by the slide 12 is received by a photomultiplier or other photoelectric device 24 which produces video signals corresponding to the characters or other information on the slide 12. When the flying spot traverses a transparent area of the slide 12, a large amount of light is received by the photomultiplier 24, so that a relatively high level of signal output is produced. When the flying spot traverses an opaque area on the slide 12, very little light reaches the photomultiplier 24, so that the signal output is low.

Figure 3:
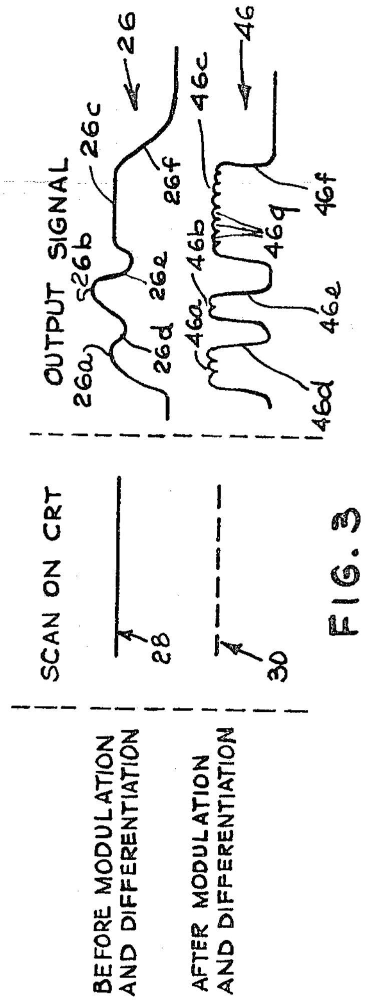
FIG. 3 is a tabular diagram showing the form of the scanning lines and the output signals with and without modulation.

As described thus far, the scanner 10 is of a type which will be familiar to those skilled in the art. It has been found that scanners of this type are deficient in that the fluorescent persistence of the phosphor used on the screen 18 of the cathode ray tube produces distortion of the output signals from the photomultiplier. The decay time of the phosphor is greater than the rise time and is generally sufficiently great to cause noticeable distortion. FIG. 3 shows an output signal 26 which illustrates such distortion. It will be seen that the signal 26 comprises three main pulses or components **26*a*, 26*b* and 26*c*, representing lines or other details on the slide 12. Due to the slow decay of the phosphor in the cathode ray tube 14, the pulses 26*a*, 26*b* and 26*c* have trailing slopes 26*d*, 26*e* and 26*f*** which are gradual, rather than steep as they should be. The gradual slope represents the slow decay of the phosphor.

Figure 4:
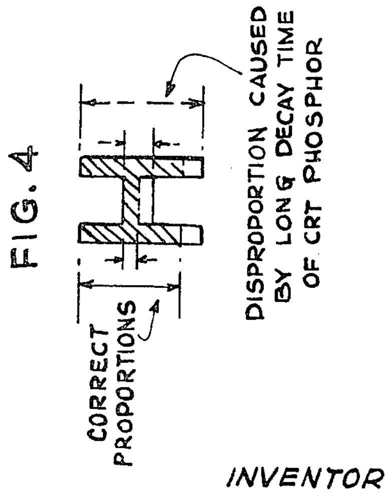
FIG. 4 is a diagram illustrating the type of distortion which is corrected by the system of the present invention.

When the distorted output signals are reproduced by a display device, such as a facsimile printer or an oscilloscope, the proportions of the characters, images and the like are changed, so that the narrower or finer details of the characters are reproduced relatively wider than they should be. The disproportion or distortion of the reproduced material is illustrated diagrammatically in FIG. 4. In this view, the solid outline represents the reproduced character. Merely by way of example, the character is shown as a letter H. The shaded area represents the form of the original character. It will be noted that the cross bar of the H is broadened. The length of the vertical bars of the H is also increased, but the broadening of the cross bar changes the proportions or shape of the character so that it is reproduced in a distorted manner. It will be understood that the representation of FIG. 4 is based on the use of scanning lines which extend vertically.

In accordance with the present invention, such distortion is greatly reduced by modulating the light output of the cathode ray tube 14 so that each individual scanning line is broken or chopped into a series of segments. In FIG. 3, the unmodulated scanning line is represented at 28, while the modulated scanning line is shown at 30. In conjunction with the modulation, the output of the photomultiplier 24 is differentiated by a differentiating circuit 32. Those skilled in the art will be familiar with such differentiating circuits. An amplifier 34 may also be employed to amplify the differentiated signal to the desired level. In some cases the amplifier 34 may incorporate a limiter or clipper for squaring the pulses in the output signal.

It will be understood that the output signal from the amplifier 34 may be transmitted to any desired distance by a transmission line or link 36 and may be reproduced by a display device 38, such as a facsimile printer or an oscilloscope.

Figure 2:
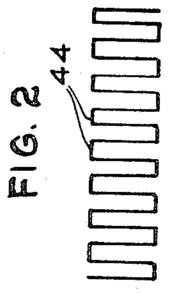
FIG. 2 is a diagram illustrating the wave form of the modulating pulses applied to the cathode ray tube of FIG. 1.

In the scanning system 10 of FIG. 1, the desired modulation is produced by modulating the electron beam in the cathode ray tube 14. Thus, the modulator 40 is connected to the control grid 42 in the electron gun 16. The modulator 40 may produce a train of pulses 44 as shown in FIG. 2. The pulses 44 may be square in shape and equally spaced so that the electron beam will be alternately turned on and off. However, the exact wave form of the modulating pulses is not critical. Normally, the frequency of the modulating pulses is such that each scanning line is chopped into quite a number of segments. The number of segments is made quite great when it is desired to reproduce especially fine detail.

The combination of the modulation and the differentiation produces an improved output signal 46 of the form illustrated in FIG. 3. As before, the signal 46 comprises three main pulses **46*a*, 46*b* and 46*c* representing details of the object being scanned. Of course, the illustration of these pulses is merely by way of example. It will be seen that the pulses 46*a*, 46*b* and 46*c*** have trailing slopes

**46*d*, 46*e* and 46*f* which are greatly steepened when compared with the gradual or distorted trailing slopes 26*d*, 26*e*, and 26*f*. The steeping of the trailing slopes is produced by the differentiation, in combination with the modulation. It will be seen that smaller pulses 46*g* are superimposed upon the main pulses 46*a*, 46*b* and 46*c*. These smaller pulses 46*g*** are due to the modulation of the scanning lines. If desired, these smaller pulses may be clipped off. However, the smaller pulses are not distinguishable when reproduced by an ordinary facsimile printer. Only the main pulses are reproduced as details of the facsimile image. The reproduced image is largely free from the disproportion or distortion of the type previously described in connection with FIG. 4.

Figure 5:
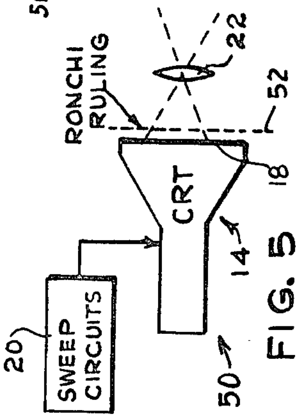
FIG. 5 is a fragmentary diagrammatic view somewhat similar to FIG, 1, but showing a modified scanning system in which the modulation is produced by a ruled screen or grating.

FIG. 5 illustrates a modified scanning system 50 in which the modulation is produced by placing a Ronchi ruling or other ruled screen 52 in front of the fluorescent screen 18 of the cathode ray tube 14. The ruled screen 52 breaks up the scanning lines into segments so that the effect of the ruled screen is very much the same as the effect of the modulation of the electron beam.

Figure 6:
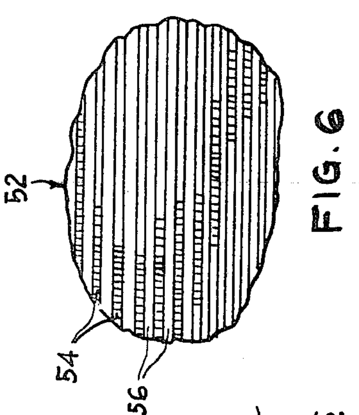
FIG. 6 is a greatly enlarged elevational view of the ruled screen as employed in the system of FIG. 5.

The screen or grating 52 comprises realtively opaque lines or rulings 54 which alternate with relatively transparent areas 56, as shown in FIG. 6, which is a greatly magnified elevational view of the screen. The lines 54 may be produced by any known or suitable method on a transparent sheet or plate, which may be made of plastic or glass. The screen 52 is oriented so that the lines 54 extend at right angles or at least transversely to the scanning lines. The spacing of the rulings or lines 54 is normally quite close so that each scanning line will be broken up into quite a number of segments. To reproduce fine detail, the lines on the screen or grating 52 are correspondingly fine.

It may be helpful to summarize the operation of the scanning systems. The cathode ray tube 14, in conjunction with the lens 22 and the photomultiplier 24, acts as a flying spot scanner which causes a spot of light to traverse one or more scanning lines across the slide or other object 12. The light output of the cathode ray tube is modulated so that the scanning lines will be broken or chopped into a series of short segments. The modulation may be accomplished by modulating the electron beam, as shown in FIG. 1, or by interposing a ruled screen or grating 52 between the cathode ray tube 14 and the slide 12, as shown in FIG. 5.

The differentiating circuits 32 differentiate the output signals from the photomultiplier 24. The modulation, in combination with the differentiation, results in a great reduction in the distortion of the output signals due to the decay time of the phosphor employed on the fluorescent screen 18 of the cathode ray tube 14. The differentiating network shapes the signal from the photomultiplier so that the trailing edge of each signal pulse rapidly decreases to zero if no further signal pulse follows immediately. The combination of the modulation and the differentiation overcomes the tendency of the trailing edges of the output signal to be stretched out. With the system of the present invention, the output signals are substantially free from such distortion so that well-proportioned facsimile characters and images may be reproduced from the signals. The reproduced images correspond closely in shape to the original characters or other information. The broadening of the fine detail is largely obviated. The improvement in the scanner results in a significant and noticeable improvement in the overall performance of the facsimile system.

Various other modifications, alternative constructions and equivalents may be employed without departing from the true spirit and scope of the invention, as exemplified in the foregoing description and defined in the following claims.

I claim:

1. In a facsimile scanner, the combination comprising a cathode ray tube for providing a high speed flying spot of light,
an optical system for focusing the light from said cathode ray tube on an object to be scanned,
means for deflecting the electron beam of said cathode ray tube to scan said object,
means for modulating the intensity of the light output from said cathode ray tube to break up the scanning lines of said spot into segments,
a photoelectric device for receiving the light from said object and producing corresponding video signals, and
means for differentiating said video signals to produce an output signal which reproduces the information on said object while minimizing distortion due to the phosphor decay time of the cathode ray tube,
said means for modulating the intensity of the light output from said cathode ray tube comprising means for supplying a series of modulating pulses to said cathode ray tube for modulating the electron beam current so as alternately to stop and start the electron beam.

2. In a facsimile scanner,
the combination comprising a cathode ray tube for providing a high speed flying spot of light,
an optical system for focusing the light from said cathode ray tube on an object to be scanned,
means for deflecting the electron beam of said cathode ray tube to scan said object,
means for modulating the intensity of the light output from said cathode ray tube to break up the scanning lines of said spot into segments,
a photoelectric device for receiving the light from said object and producing corresponding video signals, and
means for differentiating said video signals to produce an output signal which reproduces the information on said object while minimizing distortion due to the phosphor decay time of the cathode ray tube,
said means for modulating the intensity of the light output of said cathode ray tube comprising an optical ruling disposed in front of said cathode ray tube.

3. The combination of claim 2 in which said optical ruling comprises alternate relatively transparent and opaque linear elements.

4. In a system for scanning an object and producing video signals corresponding to information carried by the object,
the combination comprising a cathode ray tube having means for producing an electron beam and a fluorescent screen upon which said beam impinges to produce a spot of light,
an optical system for focusing the light from said cathode ray tube on the object to be scanned,
means for deflecting the electron beam of said cathode ray tube along at least one scanning line,
means for modulating the intensity of the light output from said cathode ray tube to break up said scanning line into segments,
a photoelectric device for receiving the light from said object and producing corresponding video signals, and
means for differentiating said video signals to produce an output signal which reproduces the information on said object while minimizing distortion due to the phosphor decay time of said fluorescent screen of the cathode ray tube,
said means for modulating the intensity of the light output of said cathode ray tube comprises a ruled screen disposed beetween said cathode ray tube and the object to be scanned.

5. The combination of claim 4, in which said ruled screen has alternate relatively opaque lines and relatively transparent areas extending transversely to said scanning line.

References Cited

UNITED STATES PATENTS

| | | | |
|---|---|---|---|
| 2,964,644 | 12/1960 | Hobrough | 88—14 |
| 2,974,254 | 3/1961 | Fitzmaurice | 250—217 |
| 2,994,779 | 8/1961 | Brouillette | 235—198 |
| 3,114,046 | 12/1963 | Cabaniss | 250—237 |
| 3,164,661 | 1/1965 | Dellon | 250—199 |

ROBERT L. GRIFFIN, *Primary Examiner.*
J. A. ORSINO, Jr., *Assistant Examiner.*

U.S. Cl. X.R.

178—6.8; 250—215, 216, 237; 315—22, 30